United States Patent
Ridgeway

[11] 4,069,523
[45] Jan. 24, 1977

[54] BATHTUB WITH CUSHIONED LINER OF FOAM PLASTIC

[76] Inventor: Louis H. Ridgeway, P.O. Box 261, Jonesville, S.C. 29353

[21] Appl. No.: 535,678

[22] Filed: Dec. 23, 1974

[51] Int. Cl.² ............................................. A47K 3/12
[52] U.S. Cl. ................................. 4/173 R; 4/177 CW; 4/185 HB
[58] Field of Search ........ 4/173, 177, 185 R, 185 AB, 4/185 F, 185 HB, 6, 7, 177 CW; 428/35, 315; 264/92, 94, 267, 269

[56] References Cited

U.S. PATENT DOCUMENTS

| 962,970 | 6/1910 | Musselman | 4/173 |
|---|---|---|---|
| 1,315,643 | 9/1919 | Schwartz | 4/173 UX |
| 2,079,739 | 5/1937 | Houseweller | 4/173 |
| 2,080,601 | 5/1937 | Cappuccio | 4/173 |
| 2,081,728 | 5/1937 | Basset | 4/173 |
| 2,362,950 | 11/1944 | Vieyra | 4/173 |
| 2,566,495 | 9/1951 | Miyakawa | 4/173 |
| 2,679,231 | 12/1954 | Strand | 4/173 |
| 2,695,256 | 11/1954 | Olloqui et al. | 4/173 |
| 2,784,417 | 3/1957 | Strand | 4/173 |
| 2,799,025 | 7/1957 | Kepler | 4/173 |
| 2,853,714 | 9/1958 | Darmstadt | 4/173 |
| 3,045,254 | 7/1962 | Cook et al. | 4/173 |
| 3,133,292 | 5/1964 | Spier | 4/185 F |
| 3,283,340 | 11/1966 | McMurtrie et al. | 4/173 |
| 3,505,693 | 4/1970 | Corbett | 4/173 |
| 3,559,634 | 2/1971 | Lillywhite | 4/173 X |
| 3,614,793 | 10/1971 | Nemiroff | 4/173 |
| 3,670,347 | 6/1972 | Weinstein | 4/177 X |
| 3,736,924 | 1/1973 | Jacuzzi et al. | 4/180 |
| 3,772,111 | 11/1973 | Ginsburg | 4/234 X |
| 3,816,234 | 6/1974 | Winfield | 428/315 X |

FOREIGN PATENT DOCUMENTS 376,981  7/1932  United Kingdom ............... 4/173

Primary Examiner—Richard E. Aegerter
Assistant Examiner—Stuart S. Levy
Attorney, Agent, or Firm—Luke J. Wilburn, Jr.; Wellington M. Manning, Jr.

[57] ABSTRACT

A tub having a shock-absorbing shell constructed from a rigid cellular material and an outer cushioning layer laminated on inner concavity-forming surfaces of the shell. The latter is constructed from a soft, flexible, closed-cell cellular material having a durable, fluid-tight, traction providing, integral skin forming the outer surface of the concavity in the tub.

11 Claims, 3 Drawing Figures

BATHTUB WITH CUSHIONED LINER OF FOAM PLASTIC

BACKGROUND OF THE INVENTION

1. Field of the Invention

This invention relates generally to cushioned bathroom ware, and particularly to bathtubs and other bath ware which offers more comfort, greater safety, and is more aesthetic than conventional tubs, while simultaneously enhancing the function of the tub and conserving water and energy.

2. Description of the Prior Art

It is generally known to provide a cushioning liner which conforms to the inner surface of a conventional rigid bathtub shell. See, for example, U.S. Pat. Nos. 2,080,601, issued May 18, 1937 to F. Cappuccio, and 3,045,254, issued July 24, 1962 to R. G. Cook et al. Further, U.S. Pat. No. 3,460,167, issued Aug. 12, 1969, discloses a bathtub cover constructed from a cellular material such as polyurethane foam.

It is also generally known to provide a bathtub constructed with the drain thereof at an end of the tub remote from the inlet faucet, and with the slope of the tub being toward the drain from the faucet, as shown in, for example, U.S. Pat. No. 3,505,693, issued April 14, 1970 to R. J. Corbett.

SUMMARY OF THE INVENTION

It is an object of the present invention to provide bath ware which affords improved comfort, greater safety, and increased aesthetic appeal when compared to conventional bath ware.

It is another object of the present invention to provide bath ware that facilitates bathing while conserving water and energy.

It is still another object of the present invention to provide a bathtub, and the like, that is rigid enough to support the weight of water and a bather in the tub, yet is able to absorb an impact when necessary.

These and other objects are achieved according to the present invention by providing a bathtub, and the like, having: a shock-absorbing shell provided with inner surfaces defining a concavity and constructed from a rigid cellular material; and an outer cushioning layer laminated on the inner surfaces of the shell, the cushioning layer being constructed from a soft, flexible, closed-cell cellular material having a durable, fluid-tight, traction-providing, integral skin forming the outer surface of the cushioning layer.

When the aforementioned construction is employed in a bathtub, and the like, the shell inner surfaces advantageously include a front wall having a substantially linear top portion and a curved bottom portion, a rear wall having a head-rest contoured top portion and a substantially linear bottom portion, and a bottom wall joined to the bottom portion of each of the front and rear walls and arranged sloping downwardly from the front wall to the rear wall. Preferably, a drain is disposed in the bottom wall adjacent its juncture with the rear wall so that water will flow downwardly from the front wall, where the water inlet spout is advantageously disposed, to the drain adjacent the rear of the tub.

A substantially planar shelf is preferably formed in one of the side walls included in the concavity defining inner surfaces of the shell. This shelf is advantageously arranged adjacent to the front wall of the shell and extends toward the rear wall of the shell and toward the other of the side walls. An overflow vent is provided in the shelf, with pipes connecting the overflow vent and shelf being embedded in the shell.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
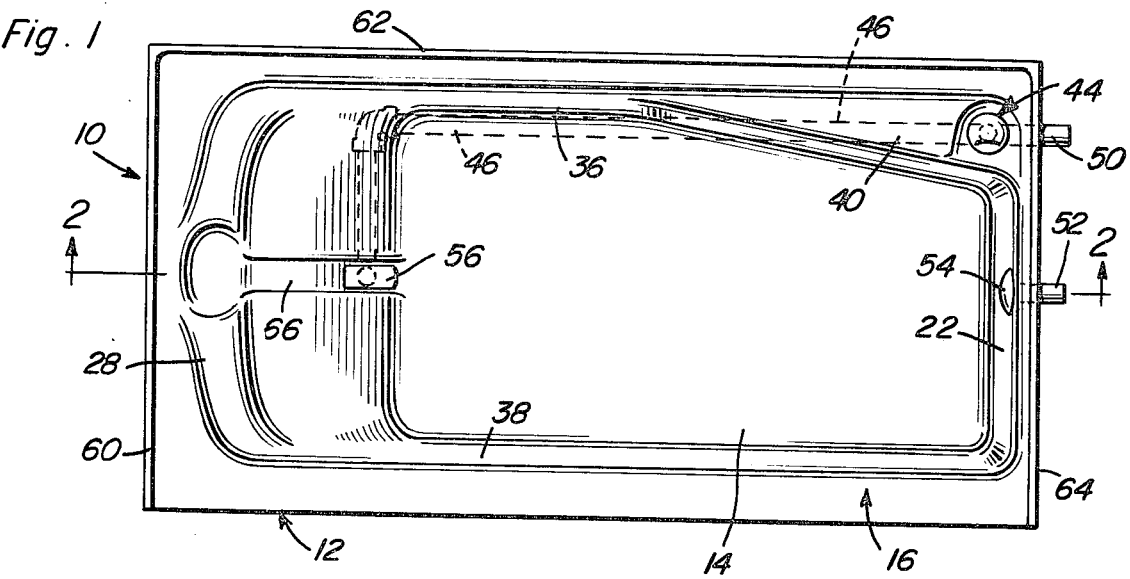
FIG. 1 is a top plan view showing a bathtub according to the present invention.
Figure 2:
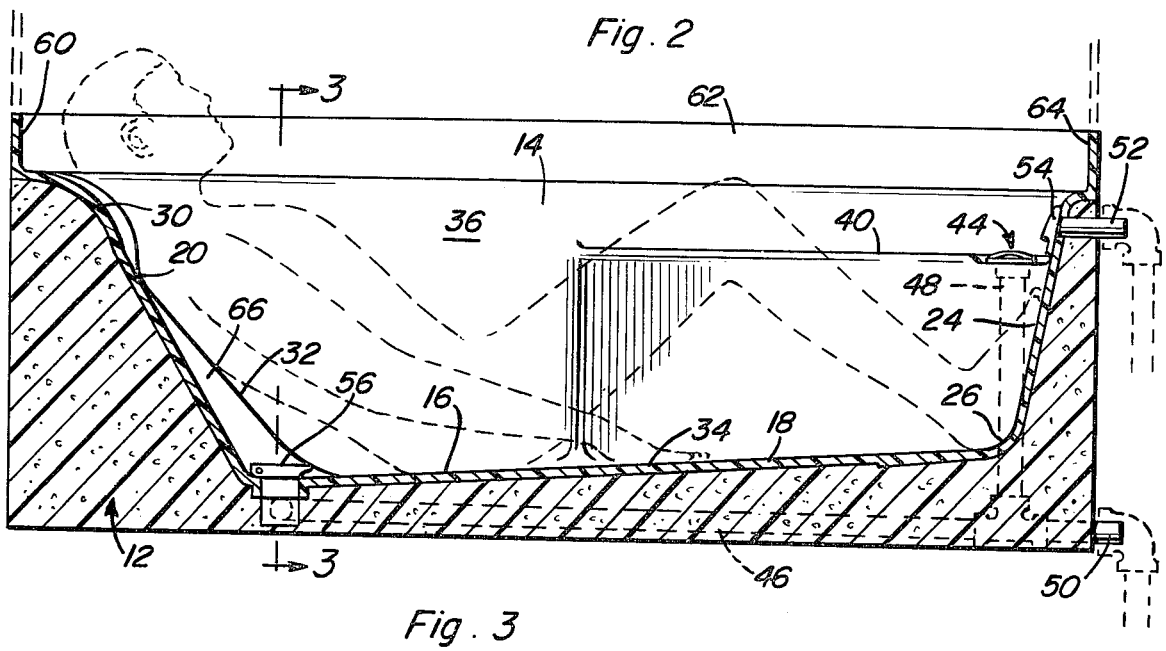
FIG. 2 is a sectional view taken generally along the line 2—2 of FIG. 1, and showing the outline of a person reclining in the tub.

Referring now more particularly to the three figures of the drawing, a bathtub 10 according to the present invention has a shock-absorbing shell 12 provided with inner surfaces defining a concavity 14 and constructed from a rigid cellular material such as rigid urethane foam. The critical criteria for the material from which shell 12 is molded, for example, is that the material have a large capacity for absorbing impact, as well as being sufficiently rigid to support the weight of water and a bather in the bathtub 10. An outer cushioning layer 16 is laminated on the concavity defining inner surfaces of shell 12. This cushioning layer 16 is advantageously constructed from a soft, flexible closed-cell cellular material 18 forming the core of layer 16 and having a durable, fluid-tight, traction-providing, integral skin 20 forming the outer surface of cushioning layer 16.

The inner surfaces of shell 12 advantageously include a front wall 22 having a substantially linear top portion 24 and a curved bottom portion 26, a rear wall 28 having a head-rest contoured top portion 30 and a substantially linear bottom portion 32, and a bottom wall 34 joined to the bottom portions 26 and 32 and arranged sloping downwardly from front wall 22 toward rear wall 28 for facilitating drainage of the bath water toward the rear of the concavity 14.

The inner surfaces of shell 12 advantageously further include a pair of spaced, substantially parallel side walls 36 and 38, which may slope slightly toward one another as they extend from the top to the bottom of shell 12. The side walls 36, 38 extend between front wall 22, rear wall 28, and bottom wall 34. A substantially planar shelf 40 is preferably formed in one of the side walls 36, 38, wall 36 being illustrated as provided with the shelf, adjacent front wall 22 and extending toward rear wall 28 and the other of the side walls 38, 36, specifically wall 38.

A conventional drain 42 is preferably disposed in bottom wall 34 adjacent the junction of wall 34 with rear wall 28, while an overflow opening 44 is provided in shelf 40. Pipes 46 and 48, embedded in the cellular material forming shell 12, connect overflow opening 44 and drain 42 for placing opening 44 in communication with drain 42. Further, a pipe 50 is advantageously connected into the pipeline formed by pipes 46 and 48 for permitting connection of drain 42 and opening 44 to a conventional plumbing system (not shown) associated with a building (not shown) in which bathtub 10 is disposed. It will be appreciated that pipe 46 may run anywhere along shell 12, such as down the middle thereof (not shown).

Figure 3:
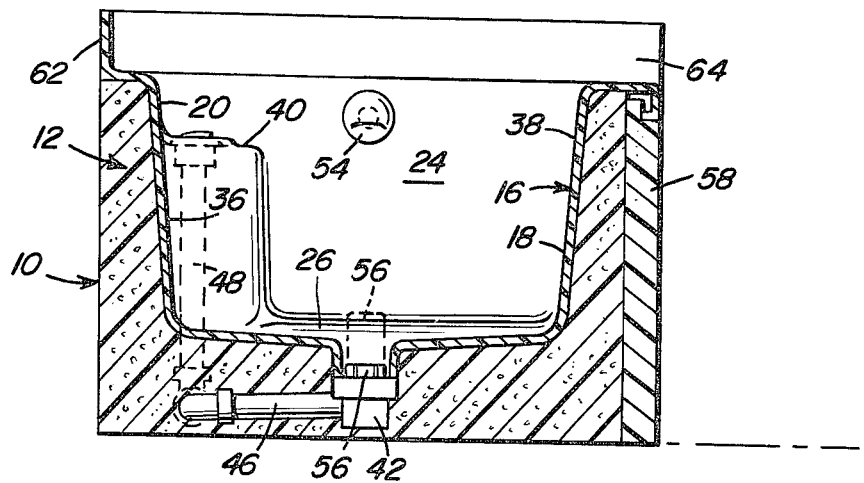
FIG. 3 is a sectional view taken generally along the line 3—3 of FIG. 2.

A pipe 52 is embedded in shell 12 for connection at the outboard side of shell 12 with a conventional water inlet pipe of the aforementioned building plumbing system, and at the concavity 14 side of shell 12 with a spout 54 for discharging water into concavity 14 in order to fill bathtub 10 to a predetermined level in the course of bathing. Further, a flap 56 is advantageously pivotally mounted in a conventional manner on bottom wall 34 at drain 42 for selectively convering the drain 42. The broken lines in FIG. 3 show this flap 56 in its raised, or drain uncovering, position which permits water to flow from concavity 14 and into pipe 46 in order to drain the tub.

A panel 58, constructed from a suitable synthetic material, is preferably arranged across that side of shell 12 which will be exposed to view of those in the presence of an installed bathtub 10. To further enhance the appearance and utility of bathtub 10, cushioning layer 16 is extended upwardly from shell 12 along any side of shell 12 anticipated to be arranged abutting a wall of a room, and the like, in which bathtub 10 is disposed. These extensions form splash guards, of which three are shown, and designated 60, 62, and 64, in keeping with the usual practice of placing a bathtub into a suitably dimensioned three-walled area of the bathroom, and the like.

A groove 66 advantageously runs along the portion 32 of tub 10 through the transverse position of the drain 42 in an extension of bottom wall 34 for allowing the bather's vertebrae to rest thereon without contact with flap 56. Further, it will be appreciated that the various walls that form the inner surfaces of shell 12 curve into a substantially common, and horizontal, plane at the top of shell 12 for forming a rim about the tub. The tub also can be used in shower stalls, and the like, by extending tile or similar walls above the tub in a manner not shown.

It will, of course, occur to those skilled in the particular art that other techniques than the use of the aforementioned rigid foam may be employed for constructing the shock-absorbing frame formed by shell 12. A distinct advantage to using the preferred rigid foam, however, is the thermal insulation inherent to such material. In addition, foam provides a lighter finished product, as well as more consistent impact absorption because there will be fewer hard spots at junctions that would probably require reinforcement if shell 12 were constructed from other materials.

It will be appreciated that the upward slope of bottom wall 34 toward the feet of a bather, since generally a person faces the faucet when entering a bathtub, facilitates cleaning of the tub because water being discharged from spout 54, which is, as mentioned above, advantageously molded into the tub itself for eliminating dangerous protrusions of conventional spouts, and which spout 54 is advantageously provided with the illustrated deflector plate at the mouth of spout 54 for directing water directly to the floor of the tub, will run the full length of the tub, thus eliminating the need to splash water to the rear of the tub. In addition, the contoured head-rest of top portion 30 of rear wall 28 permits the bather more comfort, while shelf 40 provides a support for various items, such as soap, needed when bathing. More importantly, drain 42, despite being at the rear end of the tub, is so situated as to allow a bathroom to be built on an existing, for example, concrete floor without tearing through the floor, and the provision of pipe 50 permits connection of drain 42 to existing plumbing disposed in a wall adjacent the front end of the tub. Thus, the plumbing connections are reduced to only two connections.

As will be appreciated from the above description and from the drawings, bathtub 10 essentially comprises the cushioning layer having an outer durable surface and the soft flexible closed-cell foam core and of the rigid, yet shock-absorbing frame in the form of shell 12. Outer layer 16 may be, for example, fabricated with the skin 20 being a material such as marketed under the trade-mark "U.S. Naugahyde" engaged with a, for example, three-eighths inch layer of closed cell vinyl foam, heated, and vacuum formed in a known manner to form a unit. Suitable manufacturing processes are well known to those skilled in the particular art. The unit is then placed in a mold (not shown) and self-foaming urethane poured into the unit to form shell 12. Further, while outer cushioning layer 16 may be constructed either with skin 20 and core 18 being separate sublayers or integral parts of a single layer, the latter is preferred. The resulting tub weighs, for example, only 35 to 40 pounds.

Among the advantages realized from the aforementioned construction of a bathtub, and the like, are:

1. A surface that may be embossed (not shown) to help eliminate slipping by the bather.
2. Softness that is comfortable.
3. Softness that will help eliminate the feeling of sand or grit that is almost always present when bathing.
4. If a fragile item is dropped, the curhioning will help eliminate the chance of breaking the item and causing injury to the bather.
5. If a bather does slip, the cushioning will help absorb the shock of the fall, thus preventing injury to the bather; that is, the shockabsorbing frame afforded by shell 12 fully protects the bather.
6. The comfort will aid in allowing a person to more truly relax while soaking, which is important for the health of a person.
7. There is a definite energy savings when shell 12 is constructed from a foam material due to the inherent thermal insulation of the tub which requires less hot water to achieve a desired temperature, as well as the inherent ability of the water in the tub to stay at a desired temperature for a longer period.
8. Water will be conserved simply because of the design of the tub and because additional water is not needed to re-warm water that has been standing in the tub for a reasonable length of time.
9. Cleaning of the tub is easier because of the downward slope from the head end to the rear of the tub and also because the preferred materials for constructing the skin 20 will eliminate the need for harsh abrasives when cleaning the tub.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bathtub construction providing improved comfort and safety for a bather comprising a rigid outer shell having opposed front and rear walls, opposed side walls, and a bottom wall, a layer of soft, resilient material having an outer, water-impervious surface and secured to the inner surfaces of said walls to define a water-retaining cavity for supportably containing the body of a bather, the inner surface of said rear wall sloping forwardly and downwardly to said bottom wall to support the back of a bather in a semi-reclined position in the cavity, elongated groove in said rear wall inner surface extending upwardly from said bottom wall for receiving the vertebrae of a bather when in semi-reclined position, and drain outlet means for said cavity recessed in the lower portion of said groove to prevent contact of said drain outlet means with the body of a bather when in said semi-reclined position in the cavity.

2. A bathtub construction as defined in claim 1 wherein said drain outlet means includes conduit means for discharging water from the cavity, and a closure cover operatively attached to the upper portion of said conduit means to selectively prevent the passage of water therethrough.

3. A bathtub construction as defined in claim 1 including a recess in an upper portion of said rear wall for supportably receiving the head of a bather in semi-reclined position, said elongated groove and communicating with said recess.

4. A bathtub construction as defined in claim 1 including a shelf having a generally horizontal surface extending along one of said side walls in the cavity and having outlet means therein for overflow of water from the cavity.

5. A bathtub construction as defined in claim 4 wherein said rigid outer shell comprises a light weight, shock-absorbing material, and including conduit means embedded in said shockabsorbing material and communicating said drain outlet means and said outlet means in said shelf, and further extending from said shock-absorbing material for discharge of water from said drain and shelf outlet means to waste.

6. A bathtub construction as defined in claim 1 wherein said layer of soft, resilient material comprises an inner portion of relatively soft, resilient, closed-cell, cellular material permanently secured to the inner surfaces of said walls of said outer shell and an outer portion comprised of a flexible sheet of water-impervious plastic permanently secured to the closed-cell, cellular material.

7. A bathtub construction as defined in claim 1 wherein said outer shell comprises a shock-absorbing cellular plastic.

8. A bathtub construction as defined in claim 1 wherein the inner surface of said bottom wall slopes downwardly from said front wall to said rear wall and drain outlet means to facilitate the draining of water from said cavity.

9. A bathtub construction as defined in claim 1 wherein said drain outlet means is located in said bottom wall of said shell and is recessed within the lower portion of said downwardly extending groove in said rear wall, said outlet means including an opening in said bottom wall, a pipe secured in said opening and a closure cover operatively secured to the upper opening in said pipe and positionable to prevent the passage of water therethrough.

10. A bathtub construction providing improved comfort and safety for a bather comprising a rigid shell having an open top and defining a water-receiving cavity for supportably containing the body of a bather, a portion of the inner surface of the cavity sloping downwardly and inwardly from said open top toward the bottom portion of the cavity for supporting the back of a bather in semi-reclined position in the cavity, and an elongated groove extending upwardly in said sloping surface portion from the bottom of the cavity to receive the vertebrae of a bather when in semi reclined position, and outlet means for draining water from the cavity located in the bottom of the cavity and recessed in said groove to prevent contact of the body of the bather with said outlet means when supported in said semi-reclined position therein.

11. A bathtub construction as defined in claim 10 wherein said inner surface of the shell comprises a water-impervious, soft, resilient cushioning layer.

* * * * *